July 8, 1969
J. H. WURSTER
3,454,842
CAPACITOR COOLING MEANS
Filed Nov. 24, 1967
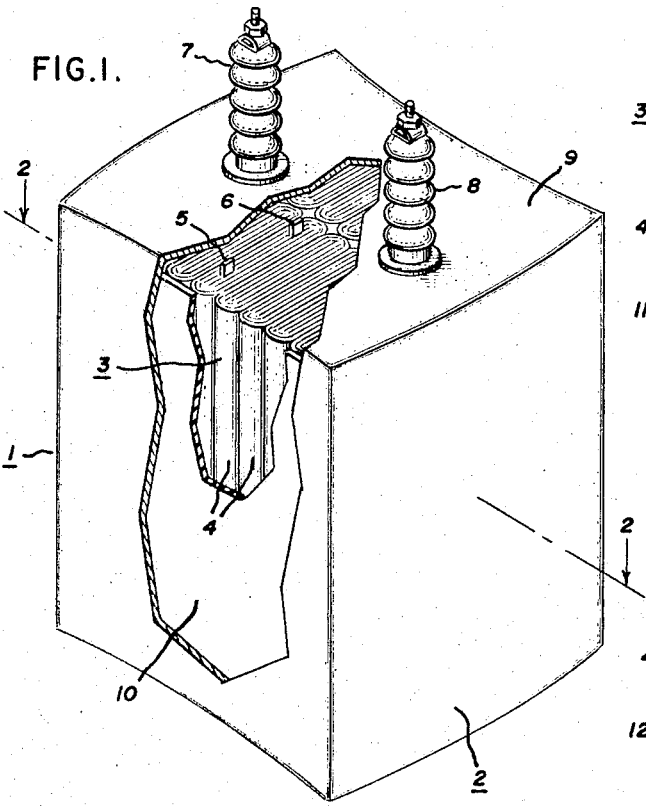
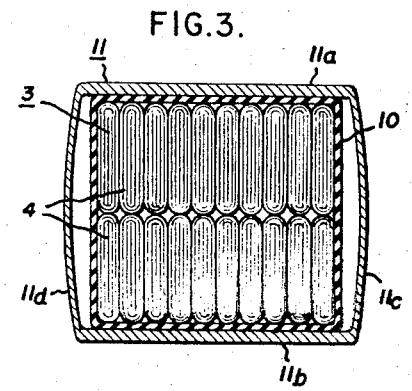
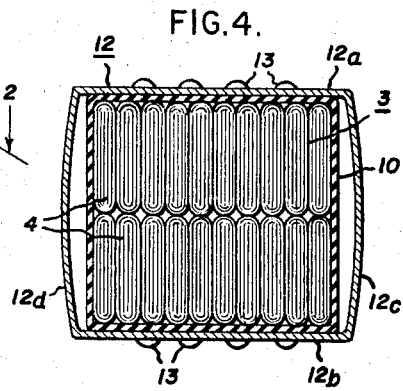
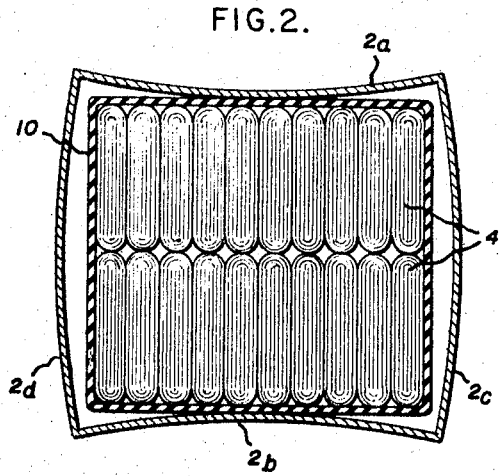
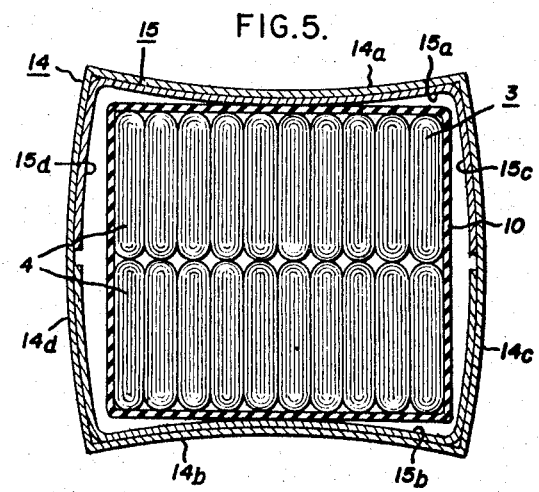
INVENTOR:
JOHN H. WURSTER,
EDWARD D. SEMRAI
BY *James J. Lichiello*
HIS ATTORNEY.

United States Patent Office 3,454,842
Patented July 8, 1969

3,454,842
CAPACITOR COOLING MEANS
John H. Wurster, South Glens Falls, N.Y., assignor to General Electric Company, a corporation of New York
Filed Nov. 24, 1967, Ser. No. 685,617
Int. Cl. H01g 1/08
U.S. Cl. 317—243
9 Claims

ABSTRACT OF THE DISCLOSURE

The sides of a rectangular capacitor case opposite the ends of the capacitator rolls therein are made rigid to maintain contact with the rolls for efficient heat transfer from the rolls to the case while other sides of the case are made predeterminedly flexible so that they will flex in and out to maintain internal pressure relatively constant with changes in liquid volume due to temperature variations.

Background of the invention

The present invention generally relates to heat transfer arrangements for dielectric liquid impregnated electrical devices. More particularly, this invention relates to arrangements for improving the heat dissipation characteristics from sealed dielectric liquid impregnated electrical capacitors.

Capacitors, particularly higher voltage A-C capacitors such as power capacitors, generate considerable heat during operation. It is essential that this heat be removed in order to provide thermal stability of the capacitor and prevent premature deterioration of the capacitor rolls which results from operating at high temperatures. Another important consideration in sealed dielectric liquid impregnated capacitor constructions is that the internal pressure must be maintained within suitable limits to retain a high degree of corona strength and thereby minimize corona discharge. In order to maintain acceptable internal pressure conditions, compensation must be made for temperature fluctuations or variations, particularly those extending to very low temperatures, to provide for volumetric and consequent pressure changes of the dielectric liquid within the capacitor.

In some capacitor constructions, an outer casing is arranged to intimately contact the capacitor roll sections in order to provide efficient heat transfer from the interior roll sections to the casings. In such arrangements, however, when low pressure conditions develop due to a drop in temperature, the casing walls are prevented by the capacitor sections from contracting inwardly as the dielectric liquid contracts for pressure compensation. In other capacitor constructions there is a relatively loose fit between the capacitor case and the capacitor roll sections. This latter arrangement permits the casing walls to contract so that extreme low pressure conditions are minimized and some measure of corona strength is maintained at low temperatures. Such a described arrangement, however, does not provide efficient heat transfer from the capacitor roll sections to the case at higher operating temperatures when there is a loose fit between the capacitor rolls and the case. The capacitor then operates at an excessively high temperature with a consequent reduction in the life of the capacitors. Still other constructions have considered both the need for pressure maintenance and heat transfer capability. One example is found in the U.S. Patent 3,219,892, Wurster, assigned to the same assignee as the present invention. In the Wurster disclosure an inner thermal plate is in intimate contact with the capacitor rolls to provide efficient heat transfer and dissipation to a separate outer case whose walls are adapted to flex in and out in response to volumetric changes in the capacitor dielectric.

Summary of the invention

It is an object of the invention to provide sealed dielectric liquid impregnated electrical capacitors with improved heat dissipation means to prolong the life and impart improved thermal stability thereto.

It is a further object of the invention to provide a sealed dielectric liquid impregnated capacitor having biasing casing wall means to improve the heat dissipating characteristics thereof while maintaining internal liquid pressure for good corona characteristics.

Briefly, according to one embodiment of the invention, there is provided a multiple roll capacitor pack wrapped in insulating material. The capacitor pack is positioned in a casing which has a first pair of relatively rigid opposed walls in biasing contact with the capacitor pack to provide efficient heat transfer from the pack to the casing, and a second pair of opposed side walls spaced from the capacitor pack and which are relatively but predeterminedly flexible so as to flex in and out in response to volumetric changes in the capacitor dielectric liquid in order to maintain a proper internal pressure of the capacitor with temperature changes.

Detailed description

The subject matter which is regarded as the invention is particularly pointed out and distinctly claimed in the concluding portion of this specification. The invention, both as to organization and the method of operation, together with further objects and advantages thereof, may be better understood by reference to the following description taken in connection with the accompanying drawings in which:

FIGURE 1 is a perspective view, partially broken away, of an electrical power capacitor embodying this invention;

FIGURE 2 is a cross-sectional view of the FIGURE 1 device taken along the line 2—2; and FIGURES 3, 4 and 5 are similar cross-sectional views showing modified arrangements in accordance with this invention.

Referring now to the drawings, and particularly to FIGURE 1, there is shown a power capacitor 1 comprising a rectangular metal container or casing 2 containing capacitor pack 3. Capacitor pack 3 includes a plurality of flattened roll sections 4, in row form, each of which is formed of a pair of electrode foils and an interposed dielectric sheet in a manner well known in the art. Each roll section 4 has electrode terminal tabs 5 and 6 connected to the respective electrode foils and projecting from the upper ends of the capacitor roll section. The terminal tabs are suitably electrically connected to lead (not shown) which extend through terminal bushings 7 and 8 mounted on cover 9. Instead of having terminal tabs as described, the capacitor roll sections 4 may be of exposed foil arrangements well known in the art, in which foil sections project from opposite ends of the roll and leads are suitably attached to the exposed foils. Capacitor pack 3, which contains one or more rows of rolls 4, is wrapped in a covering of insulating material 10, such as one or more layers of kraft paper, which separates pack 3 from metal casing 2. Casing 2 is hermetically sealed by cover 9 and contains a dielectric liquid such as chlorinated diphenyl, mineral oil or the like, in which capacitor pack 3 is immersed and which impregnates the dielectric paper sheets thereof. In some applications the dielectric medium may be a gas, such as sulphur hexafluoride.

As best shown in FIGURE 2, in accordance with the invention, casing 2 comprises inwardly bowed sides 2a and 2b and opposite, outwardly bowed sides 2c and 2d. The inwardly bowed sides 2a and 2b press inwardly and are in continuous contact through insulation 10 with the central portions of capacitor pack 3 and by virtue of being inwardly bowed are adapted to resist movement away from capacitor pack 3 upon expansion of the internal dielectric with temperature. The central portions of capacitor pack 3 are usually the hottest portions during the operation of the capacitor and by insuring that continuous contact is maintained between the side walls 2a and 2b and the central portions of the capacitor pack, more effective heat transfer from the capacitor pack 3 to the casing 2 is achieved.

As illustrated in FIGURE 2, sides 2a and 2b, denoted as side walls, are bowed inwardly to contact the rolls 4 along their longer edge surfaces. These side walls 2a and 2b are adapted to maintain their contact with the rolls 4 upon contraction of rolls 4 or pack 3. This contraction is ordinarily associated with volume change of the dielectric liquid as a result of temperature variation. Side walls 2a and 2b may be somewhat flexible to follow expansion and contraction, or be primarily sufficiently stiff to retain a given degree of contact at lowest temperatures encountered. Some degree of flexibility from the lowest temperature to high temperatures is desirable.

Walls 2c and 2d, denoted as end walls, are usually operating at a much cooler temperature than side walls 2a and 2b because they are adjacent the longer sides of rolls 4. For example, as illustrated, side wall 2d may only contact two rolls 4 as compared to side wall 2a which may contact as many as 9 rolls. Consequently, end walls 2c and 2d are made predeterminedly flexible to accommodate volume changes in the casing. When and if these walls move out of contact with the pack no significant heat heat retention is encountered compared to the increase in heat transmission through side walls 2a and 2b. Further end walls 2c and 2d are more flexible than side walls 2a and 2b and are primarily responsive to volume changes substantially independently of side walls 2a and 2b.

The degrees of flexibility of the walls of FIGURE 2 may be accomplished by material changes, thickness changes, configuration changes such as convolutes or corrugations and other well known pressure compensators. Example of corrugation or diaphragm type walls is shown in U.S. Patent 2,347,976, Trapp et al., and 2,545,661, Harrison.

Internal pressure of the capacitor dielectric must be maintained at a suitable level so as to retain high resistance to corona discharge. Corona discharge is an electrical discharge, which takes place within dielectric voids, and higher pressures reduce their occurrence, for one reason, because higher pressures tend to keep voids, as well as the material, filled with liquid. Volumetric changes of the capacitor dielectric take place with temperature variations and means must be provided to compensate for these volumetric changes an minimize voids. Outwardly bowed casing end walls 2c and 2d are adapted to maintain the internal capacitor dielectric pressure by flexing in and out with dielectric volumetric changes due to temperature variations. To this end, end walls 2c and 2d are outwardly bowed and are spaced from the capacitor pack. Although this invention is applicable to any form of rectangular capacitor casings, it is most practical when the capacitor casings are relatively square. In a relatively square casing flexing end walls 2c and 2d have a large enough area to flex sufficiently to change the volume of the capacitor casing to adequately maintain internal pressure.

FIGURE 3 shows an alternative embodiment of the invention in which the inwardly bowed side walls 2a and 2b of FIGURE 2 are replaced by side walls 11a and 11b as shown in FIGURE 3. Side walls 11a and 11b, instead of being inwardly bowed to maintain continuous contact through insulation 10 with the central portions of capacitor pack 3, are given sufficient rigidity to resist movement away from the capacitor pack 3 upon expansion of the internal dielectric with temperature. This rigidity is provided by making them of a relatively thicker material than the opposite, outwardly bowed end walls 11c and 11d which, as before, are adapted to flex in and out to maintain internal pressures with volumetric changes of the dielectric.

FIGURE 4 shows still another embodiment of the invention in which continuous roll contact for effective heat transfer is maintained between casing side walls 12a and 12b and capacitor pack 3 by forming strengthening ridge elements 13 on the side walls. Longitudinally disposed ridges 13 are shown in FIGURE 4 but transverse ridges might, of course, be utilized. As before, opposite end walls 12c and 12d are outwardly bowed and are adapted to reversibly flex to maintain a predetermined internal pressure with respect to volumetric change of the dielectric.

FIGURE 5 illustrates another embodiment of the invention which is particularly suited for cooling capacitors having steel, stainless steel or other low thermal conducting material casing. FIGURE 5 shows a capacitor case construction in which an outer capacitor casing 14 comprises inwardly bowed side walls 14a and 14b and opposite, outwardly bowed end walls 14c and 14d. Inside the outer casing 14 is disposed an intermediate wall member 15, of aluminum or any other good thermally conductive material, having inwardly bowed side walls 15a and 15b and opposite, outwardly bowed end walls 15c and 15d. The intermediate member 15 is in intimate coextensive heat contacting relationship with outer casing 14. The inwardly bowed side walls 15a and 15b of aluminum member 15 are maintained in contact with the inwardly bowed side walls 14a and 14b of outer casing 14 by virtue of the side walls being complementary bowed. Outwardly bowed end walls 15c and 15d of inner aluminum member 15 are maintained, for maximum heat transfer, in contact with outwardly bowed end walls 14c and 14d of outer casing 14 by being spot welded or otherwise suitably affixed thereto. This contact may also be maintained by an inherent spring action of the inner aluminum member or by the addition of suitable springs or biasing means. Outwardly bowed end walls 15c and 15d of the inner aluminum member therefore flex with the outwardly bowed end walls of the outer casing when there is a volumetric change of the capacitor dielectric. Intermediate wall member 15 is positioned in surrounding relationship with respect to pack 3 and may therefore be conveniently provided in half sections such as square U sections, L sections and the like.

Since the central portion of the capacitor pack 3 is usually the hottest portion of the capacitor during operation, a construction such as in FIGURE 5 with an inner aluminum member provides efficient heat transfer to steel or stainless steel side walls 14a and 14b and also conducts a substantial portion of the heat to the cooler end walls 15c and 15d of the inner aluminum member 15 which is transferred to the cooler outer casing end walls 14c and 14d.

Although the invention has been described particularly with respect to A-C power capacitors, it is evident that it has application to other types of capacitors such as high energy storage capacitors, pulse forming capacitors and other electrical devices where dissipation of heat from the apparatus while maintaining internal pressure is a problem. And although the present invention has been described with reference to particular embodiments thereof, it will be understood that numerous modifications may be made by thos skilled in the art without actually departing from the scope of the invention. Therefore, the appended claims are intended to cover all such equivalent variations as come within the true spirit and scope of the invention.

What I claim as new and desire to secure by Letters Patent of the United States is:

1. An electrical capacitor comprising in combination:
    (a) a casing;
    (b) at least one row of flattened capacitor roll sections having opposed flat side surfaces and interconnecting longer edge surfaces in said casing;
    (c) a pair of opposite side walls parallel to said row of roll sections and in heat transfer contact with the longer edge surfaces of at least the inner ones of said roll sections in said row;

(d) a pair of opposite end walls transverse to the ends of said row and predeterminedly flexible in response to variances in pressure in said casing;

(e) a dielectric liquid impregnant in said roll sections and casing;

(f) said end walls adapted to reversibly flex due to pressure variance in said casing to retain pressure conditions in said casing; and (g) said side walls including means therein to maintain engagement thereof with said row of capacitor section rolls for good heat transfer therefrom during the pressure variances causing said end walls to flex.

2. An electrical capacitor in accordance with claim 1 in which said side walls are inwardly-bowed to maintain contact with said row of capacitor roll sections despite temperature or pressure changes on the inside of said container.

3. An electrical capacitor in accordance with claim 1 in which said side walls are formed of thicker material than said end walls.

4. An electrical capacitor in accordance with claim 1 in which said side walls include stiffening means formed thereon.

5. The invention as recited in claim 1 wherein said row of capacitor roll sections is wrapped in an electrically insulating material wrapper.

6. The invention as recited in claim 5 wherein plural parallel rows of capacitor roll sections are employed.

7. The invention as recited in claim 1 wherein an intermediate wall member of good thermal conductivity is interposed between said row of capacitor roll sections, and said intermediate wall member is in direct contact with the side walls of said casing.

8. The invention as recited in claim 7 wherein said intermediate wall member is coplanar with and in coextensive contact with said casing.

9. The invention as recited in claim 8 wherein said intermediate wall member is aluminum and said casing is steel, and means are employed to maintain contact thereof.

References Cited

UNITED STATES PATENTS

| | | | |
|---|---|---|---|
| 2,347,976 | 5/1944 | Trapp | 174—12 X |
| 2,933,664 | 4/1960 | Linderholm | 317—243 |
| 3,219,892 | 11/1965 | Wurster | 317—243 |
| 3,299,333 | 1/1967 | Rayno | 317—247 |

FOREIGN PATENTS

| | | |
|---|---|---|
| 467,804 | 6/1937 | Great Britain. |
| 515,382 | 12/1939 | Great Britain. |
| 679,455 | 9/1952 | Great Britain. |
| 780,293 | 7/1957 | Great Britain. |
| 152,916 | 3/1963 | Russia. |

R. A. GOLDBERG, *Primary Examiner.*

U.S. Cl. X.R.

174—12, 15; 317—260

UNITED STATES PATENT OFFICE
CERTIFICATE OF CORRECTION

Patent No. 3,454,842                                                               July 8, 1969

John H. Wurster

It is certified that error appears in the above identified patent and that said Letters Patent are hereby corrected as shown below:

In the sheet of drawings, lower right-hand corner, cancel "EDWARD D. SEMRAI".

Signed and sealed this 14th day of April 1970.

(SEAL)
Attest:

Edward M. Fletcher, Jr.                          WILLIAM E. SCHUYLER, JR.
Attesting Officer                                          Commissioner of Patents